(12) United States Patent
Schubert (10) Patent No.: US 8,720,410 B2
(45) Date of Patent: May 13, 2014

(54) MODIFIED CRANKSHAFT PISTON INTERFACE FOR OPTIMIZED CYLINDER PRESSURE AND TORQUE OUTPUT

(71) Applicant: Hans G. Schubert, Palo Alto, CA (US)

(72) Inventor: Hans G. Schubert, Palo Alto, CA (US)

( * ) Notice: Subject to any disclaimer, the term of this patent is extended or adjusted under 35 U.S.C. 154(b) by 0 days.

(21) Appl. No.: 14/047,969

(22) Filed: Oct. 7, 2013

(65) Prior Publication Data

US 2014/0096740 A1    Apr. 10, 2014

Related U.S. Application Data

(60) Provisional application No. 61/711,133, filed on Oct. 8, 2012.

(51) Int. Cl.
| | | |
|---|---|---|
| F02B 75/28 | (2006.01) | |
| F02B 41/04 | (2006.01) | |
| F16J 1/14 | (2006.01) | |
| F16C 7/02 | (2006.01) | |
| F02B 75/32 | (2006.01) | |

(52) U.S. Cl.
CPC ............... F02B 41/04 (2013.01); F02B 75/28 (2013.01); F16C 7/023 (2013.01); F16J 1/14 (2013.01); F02B 75/32 (2013.01)
USPC .................. 123/197.3; 123/197.4; 123/197.1; 123/48 B; 123/78 E; 123/51 R (58) Field of Classification Search
CPC ........ F02B 75/28; F02B 75/282; F02B 75/32; F02B 75/30; F02B 2275/36; F16J 1/16; F16J 1/14; F16C 7/023
USPC ............................................. 123/197.3, 197.4
See application file for complete search history.

(56) References Cited

U.S. PATENT DOCUMENTS

| 4,567,866 | A | * | 2/1986 | Schubert | .................... 123/197.1 |
| 5,239,958 | A | * | 8/1993 | Booher | ...................... 123/197.2 |
| 5,865,092 | A | * | 2/1999 | Woudwyk | ....................... 92/216 |

* cited by examiner

*Primary Examiner* — Rinaldi Rada
*Assistant Examiner* — Kevin Lathers
(74) *Attorney, Agent, or Firm* — Ray K. Shahani, Esq.; Kin Hung Lai (57) ABSTRACT

An improved piston crankshaft interface device provides a stabilized and balanced follower-guide member or "follower" which supports a fulcrum that is created by the point at which the connecting rod fastens to the sliding members within the follower. Sliding members fitted for follower allow the fulcrum to slide with ease up and down, within the follower wherein the movement of the follower is stabilized by attaching members, which fasten the follower to the piston, such that the follower and piston move in unison, as a unit, within the cylinder.

1 Claim, 11 Drawing Sheets

MODIFIED CRANKSHAFT PISTON INTERFACE FOR OPTIMIZED CYLINDER PRESSURE AND TORQUE OUTPUT

RELATED APPLICATIONS

This Application is a Nonprovisional Patent Application related to U.S. Provisional Patent Application Ser. No. 61/711,133 filed Oct. 8, 2012 entitled "MODIFIED CRANKSHAFT PISTON INTERFACE FOR OPTIMIZED CYLINDER PRESSURE AND TORQUE OUTPUT", which is incorporated herein by reference in its entirety, and claims any and all benefits to which it is entitled therefrom.

FIELD OF THE INVENTION

The invention relates to a crankshaft piston interface within an internal combustion engine, and more particularly to a modified crankshaft piston interface which improves fuel efficiency and reduces harmful exhaust gas emission of the engine.

BACKGROUND OF THE INVENTION

Various crankshaft piston interface designs are used to improve overall energy efficiency of an internal combustion engine.

U.S. Pat. No. 4,567,866, issued on Feb. 4, 1986 to Applicant, hereby incorporated by reference and claimed any priority thereof, discloses a crankshaft piston interface using a piston-crankshaft linking member and a sliding guide for mounting the fulcrum of the linking member. The design permitted an extended power stroke to more than 180 degrees of rotation of the crankshaft, wherein the piston reaches its top dead center position ("TDC") at some time after the crank pin and the sliding guide have reached their TDC. The speed at which the piston moves during the following stroke toward its bottom dead center ("BDC") is lower than the speed of the sliding guide. The piston reaches its BDC after the crankshaft has passed through the 180 degree position, at a time the sliding guide is already moving away from its BDC toward its TDC. Hence, the power stroke and intake stroke extend more than 180 degrees of rotation of the crankshaft. During the compression stroke, the piston moves toward its TDC with a velocity which is higher than that of the sliding guide. While the piston moves from BDC to TDC, the crankshaft rotates less than 180 degrees. Therefore, it is disclosed that the extended power stroke results in higher output of the engine.

The designed engine directly addresses the challenge of heat loss present in all internal combustion engines presently used. It raises the mean effective pressure without raising the compression pressure or changing the cylinder size. Prior art systems extract more power by raising the compression pressure, simply incorporating a super charger, or a turbo charger as it is commonly known as, which causes more air to be pressed into the cylinder, or just increasing the engine size. However, this requires equalizing the mixture of fuel and air, wherein optimal functioning requires an air fuel ratio of 14:1, i.e. 14 pounds of air and 1 pound of fuel. Thus raising the compression pressure requires greater quantities of air to be pressed into the cylinder, thereby using more fuel. Embodiments disclosed enable an increase in the mean effective pressure without altering the air to fuel ratio.

However, this original design is flawed for several reasons. First, on the actual working engine, the pin connecting the main rod of the crankshaft to the sliding guide had to be offset, which caused the sliding guide to be out of balance each time it moved through a full cycle of all four strokes. This resulted in increased stress on the cylinder. The design did not result in a durable, long-lasting crankshaft piston interface. Second, on the original design, the sliding guide used up too much space in the cylinder.

ADVANTAGES AND SUMMARY OF INVENTION

This invention represents a modification of existing crankshaft piston interfaces in an engine design which supports the clean air effort by using more energy to power the crank shaft instead of losing energy due to heat loss. Today's best internal combustion engines lose 65-70% due to heat loss.

The improved piston crankshaft interface device of the present invention provides a stabilized and balanced follower-guide member or "follower", which supports the fulcrum that is created by the point at which the connecting rod fastens to the sliding members within the follower. Sliding members fitted for follower allow the fulcrum to slide with ease up and down, within the follower. Furthermore, the movement of the follower is stabilized by attaching members, which fasten the follower to the piston, such that the follower and piston move in unison, as a unit, within the cylinder. This is an improvement over the old design in which the piston and the sliding guide, as it was therein termed, each moved up and down within the cylinder, independent of the other, and wears out the sliding guide and the follower.

The modified piston-follower unit of the present invention permits a shorter cylinder and a more stabilized follower. Because the distance between the piston and the follower is fixed, it utilizes less space within a cylinder chamber. An overall smaller combustion chamber allows volume to drop at a slower rate during the power stroke while simultaneously maintaining a higher pressure.

Recent improvement in combustion engine and fuel injection technologies are incorporated into and expand the scope of the present invention.

For a better understanding of the invention, reference is made to the following detailed description of embodiments thereof which should be taken in conjunction with the prior described drawings.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

For a better understanding of the invention, a reference is made to the following detailed description of the preferred embodiments thereof which should be taken in conjunction with the prior described drawings.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1A:
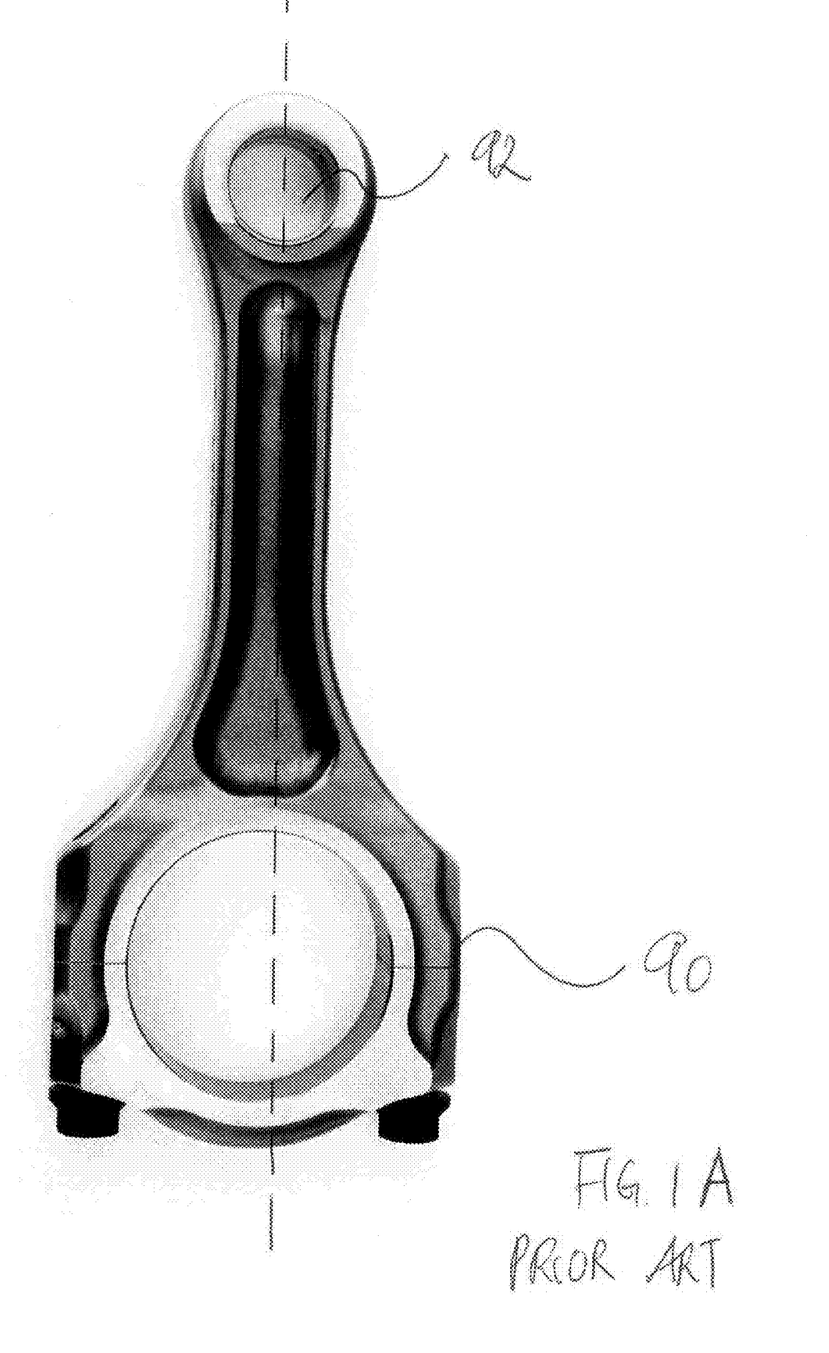
FIG. 1A (prior art) is a representative view of a conventional commercial connection rod 90.

FIG. 1A (prior art) is a representative view of a conventional connection rod 90. Conventional connecting rod 90 typically has one top end opening 92 operably connected to a piston (not shown) as a fulcrum and one lower end connected to a crankshaft (also not shown), converting reciprocating motion of the piston into rotating motion of the crankshaft.

Figure 1B:
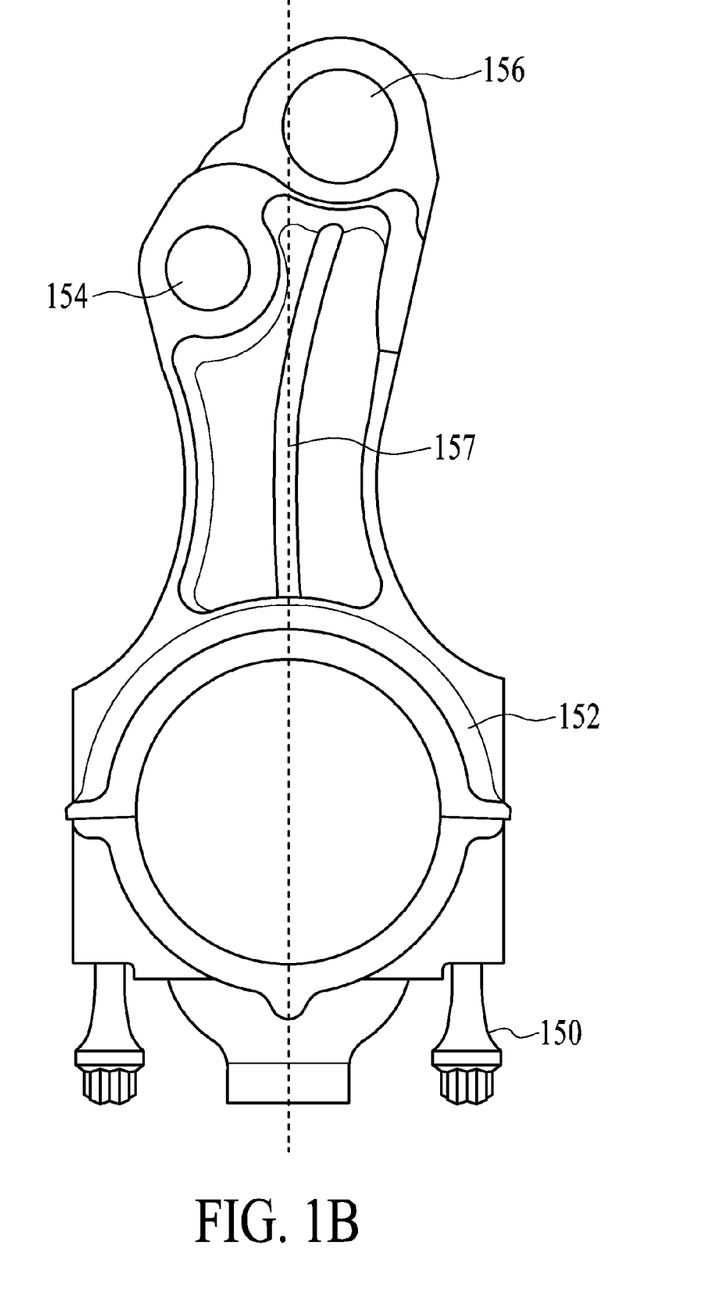
FIG. 1B is a representative top view of connecting rod 150 of crankshaft piston interface of the present invention 100.
Figure 1C:
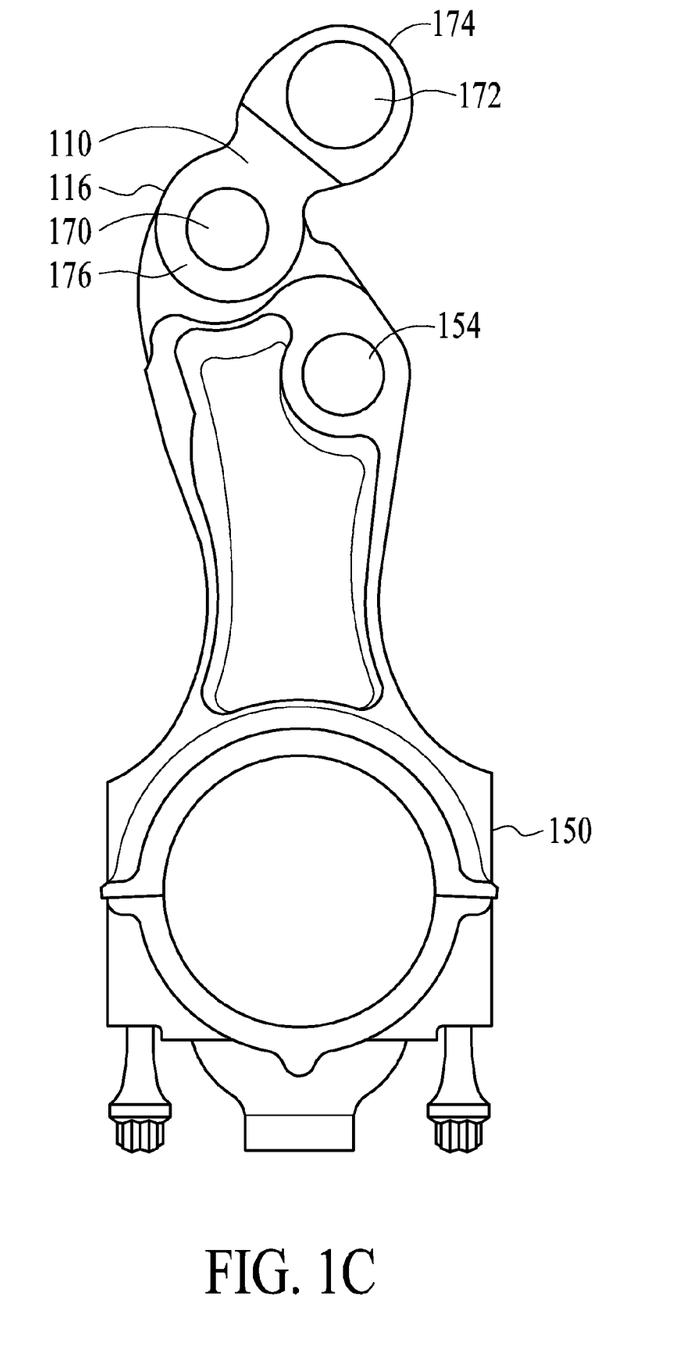
FIG. 1C is a representative top view of connecting rod 150 coupling with main link 110.

FIG. 1B is a representative top view of connecting rod 150 of crankshaft piston interface of the present invention. FIG. 1C is a representative top view of connecting rod 150 coupling with main link 110. As shown in FIG. 1B, connecting rod 150 of the present invention 100 instead has two off-center top openings 154 and 156. Upper top opening 156 which has a larger diameter connects to main link 110 and subsequently to piston 101 (not shown) and lower top opening 154 which has a smaller diameter connects slidably to follower 120 (not shown). Connecting rod 150 further has an internal oil tube 157 which allows engine oil circulation and especially provides lubrication to upper top opening 156 during the running of the engine.

Figure 1D:
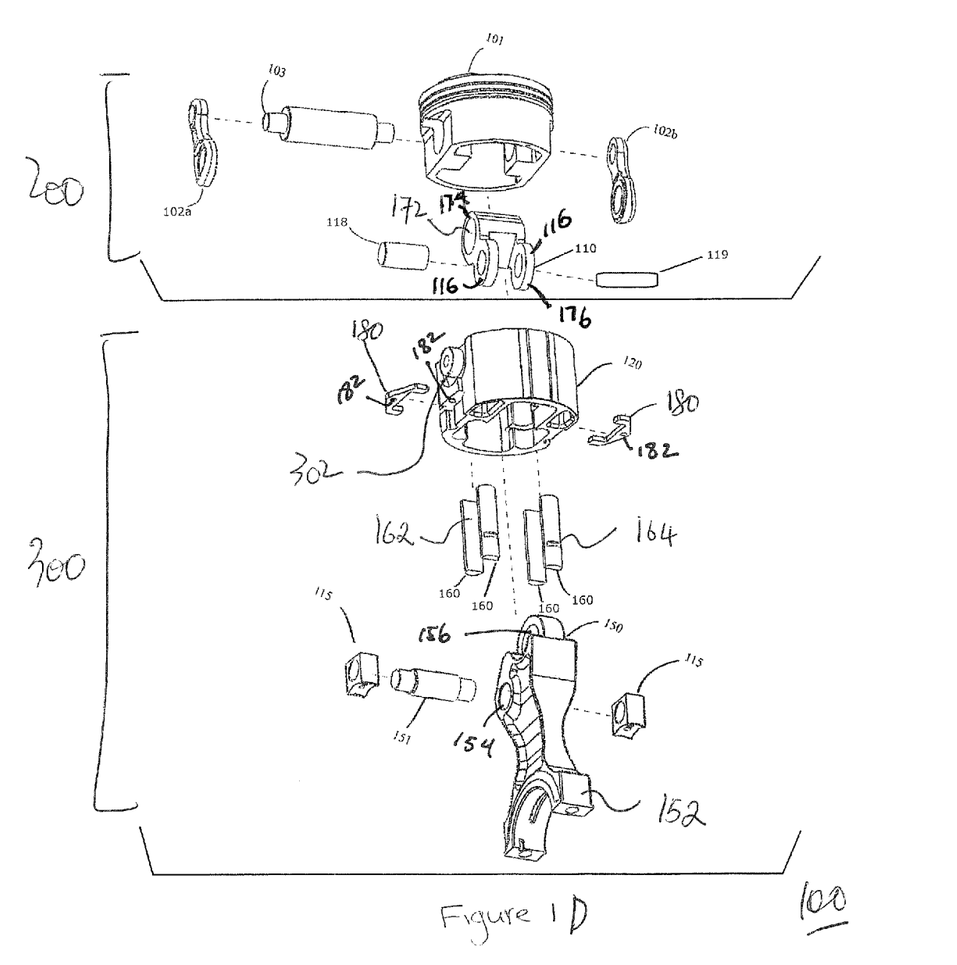
FIGS. 1D and 1E are representative exploded views of one embodiment of crankshaft piston interface of the present invention 100.

FIG. 1D illustrates a representative exploded view showing how piston assembly 200 and connecting rod/follower assembly 300 are coupled together in the crankshaft piston interface 100. Connecting rod 150 of a crankshaft (not shown) has a first end lower portion 152 that is operably connected with the crankshaft for movement in unison therewith. Connecting rod 150 has a lower top opening 154 connected to two slides 115 within a follower 120, via a slide connecting pin 151. The connecting pin 151 inserted through the lower top opening 154 of the connecting rod 150, subsequently fastened operably by two slides 115 which allows the connecting rod 150 to swivel around. The second end upper portion of the connecting rod 150 is slidably received in the follower 120 via a sliding assembly containing essentially slides 115 and two pairs of follower inserts 160. In one embodiment, slides 115 are designed to slide vertically along the flat, facing surfaces 162 of the four follower inserts 160. As best shown in FIG. 1B, once connecting rod 150 is coupled with sliding assembly which contains slides 115 and two pairs of follower inserts 160, the entire assembly is received by follower 120, specifically in two identical slots or grooves 122 and 124 on opposing sides of the follower 120. Once the entire assembly is in place, the positions of the four follower inserts 160 are secured by two follower retainers 180 coupled at the notched portions 164 on each of the slides 160. Follower retainers 180 are attached to follower 120 by a screws (not shown) through corresponding holes 182 in retainers 180 and follower 120. In this manner, while the follower inserts 160 positions are locked, slides 115 can slide vertically along the flat surfaces 162 of the four follower inserts 160. Consequently, slides 115 fitted within the follower 120, allow the fulcrum assembly 402 positioned at the lower top opening 154 where connecting rod 150 meets connecting pin 151 and slides 115 to slide up and down with ease within the follower assembly 300.

Figure 1E:
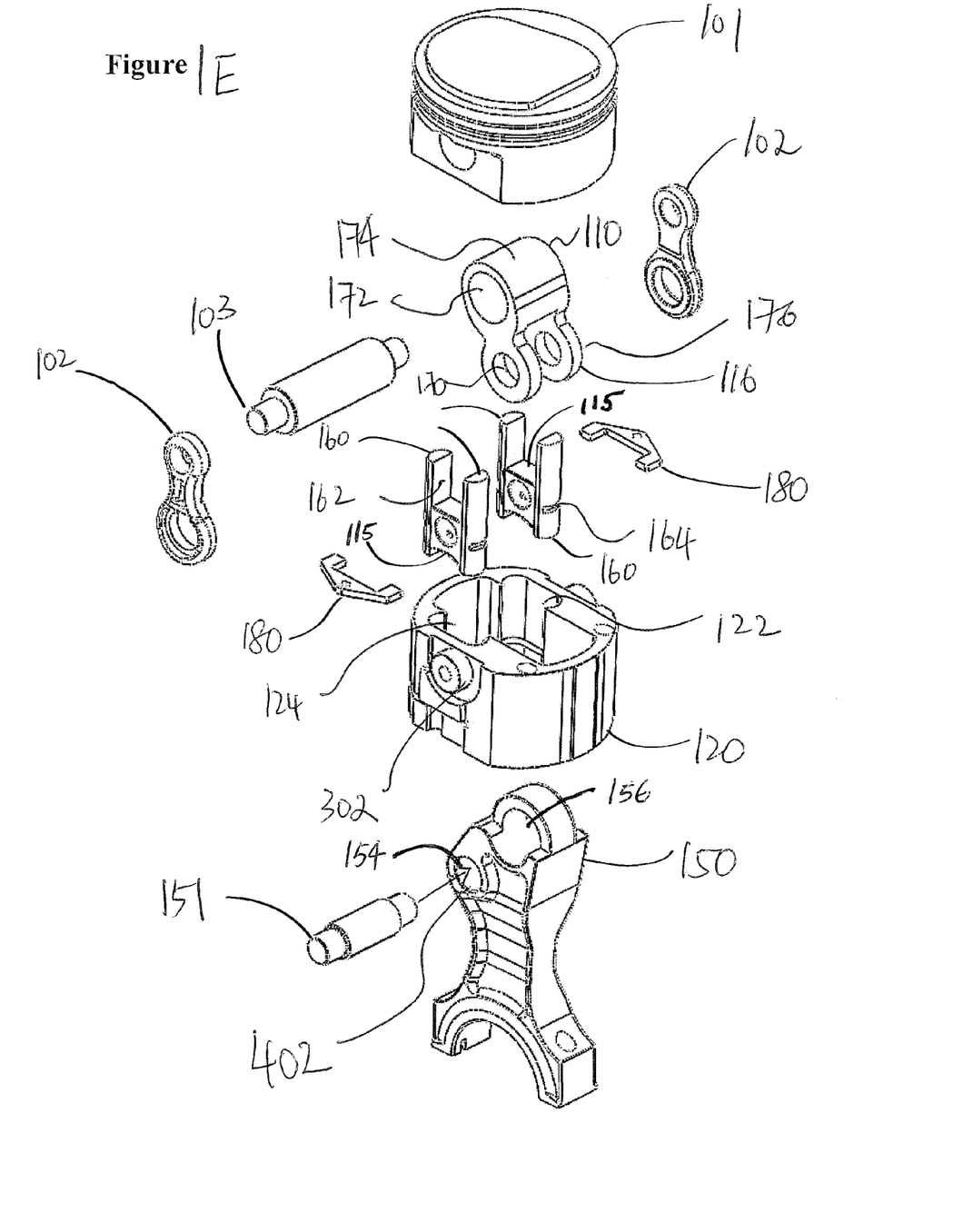
Figure 2A:
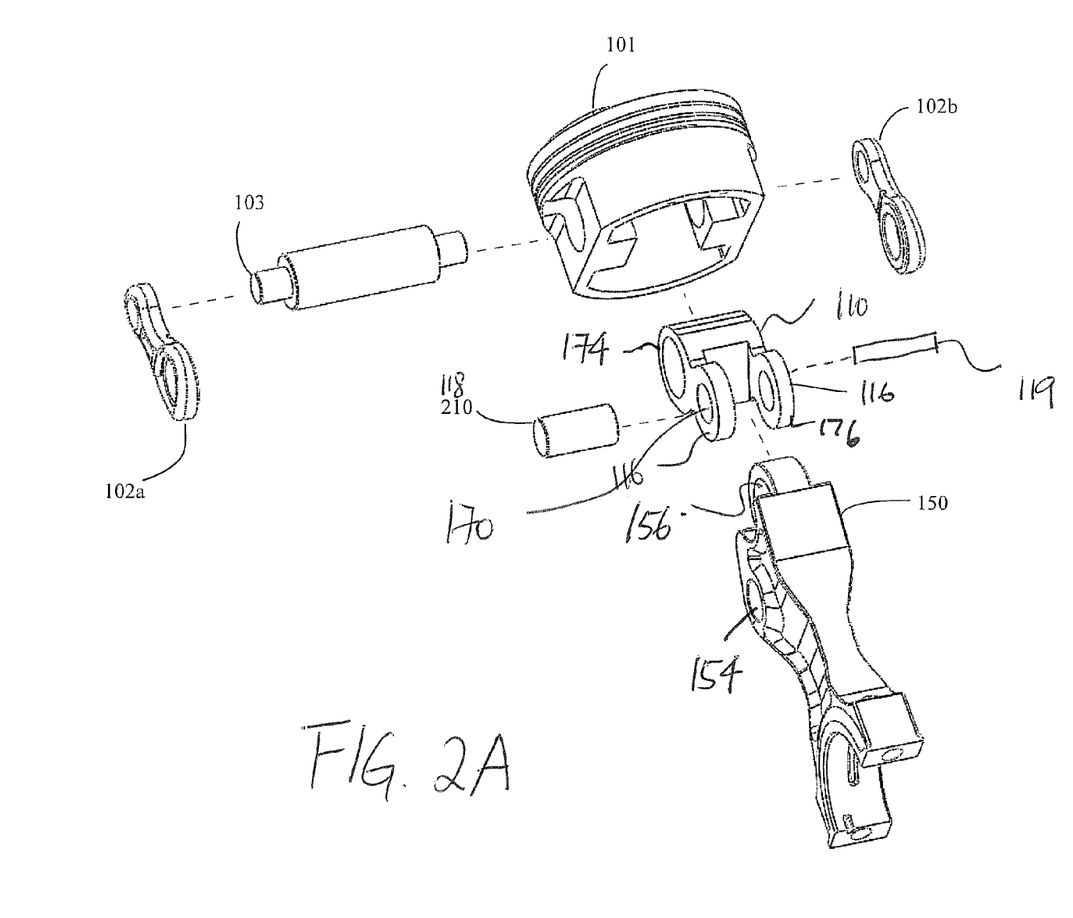
FIG. 2A illustrates an embodiment for the main link 110 as shown in FIGS. 1A and 1B.

As best shown in FIGS. 1C and 1E, main link 110 has a first end portion 176 with two extension arms 116 and a common hole of smaller diameter 170 and a second end portion 174 which bears a hole of larger diameter 172 for connecting to the piston 101. Connecting rod 150 is pivotally connected at its upper top opening 156 to the first end portion 176 of a main link 110 having a hole of smaller diameter 170. As best shown in FIG. 2A, the upper top opening 156 of connecting rod 150 is inserted between the two extension arms 116 of main link 110. Main link sleeve bearing 118 is inserted through the smaller hole 170 in main link 112 and subsequently link pin 119 is inserted in main link sleeve bearing 118. Consequently, link pin 119 is retained by press fit.

Figure 2B:
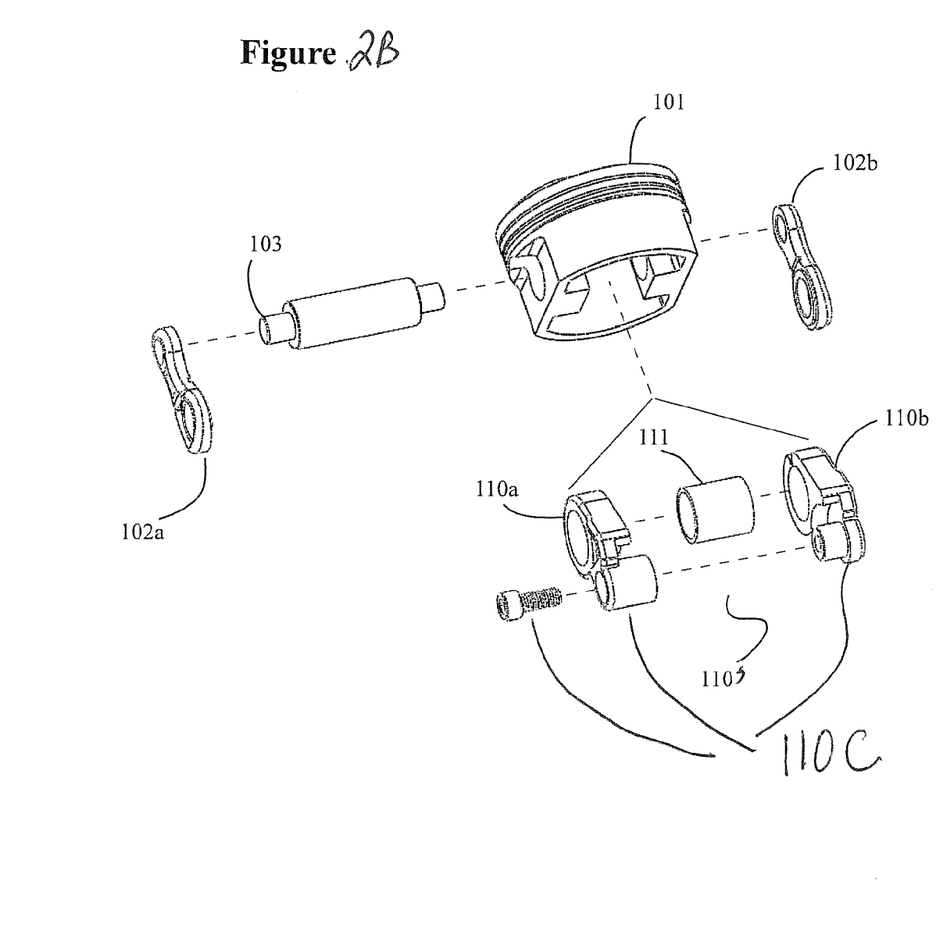
FIG. 2B illustrates an alternative embodiment for the main link 110'.

FIG. 2B illustrates an alternate embodiment for the main link 110'. As shown, main link 110' is slightly modified from the embodiment shown in FIG. 1D. FIG. 2B shows the linkage assembly of the main link 100' wherein two main link halves 110a and 110b are joined together via a screw member assembly 110c at its first end portion 176', and a hollow circular insert 111, for connecting to the piston 101 and receiving wrist pin 103. Specifically, each main link half 110a and 110b inserts into either side of the upper top opening 156 of the connecting rod 150, such that when the two main link halves 110a and 110b join together, the main link 110' is pivotally linked to the connecting rod 150. The main link assembly is secured in place by a screw member 110c, screwed through the smaller diameter hole at its first end portion 176' of the main link 110'. The main advantage of the alternative main link 110' embodiment is to provide more secure and sturdy connection to connecting rod 150.

Figure 3:
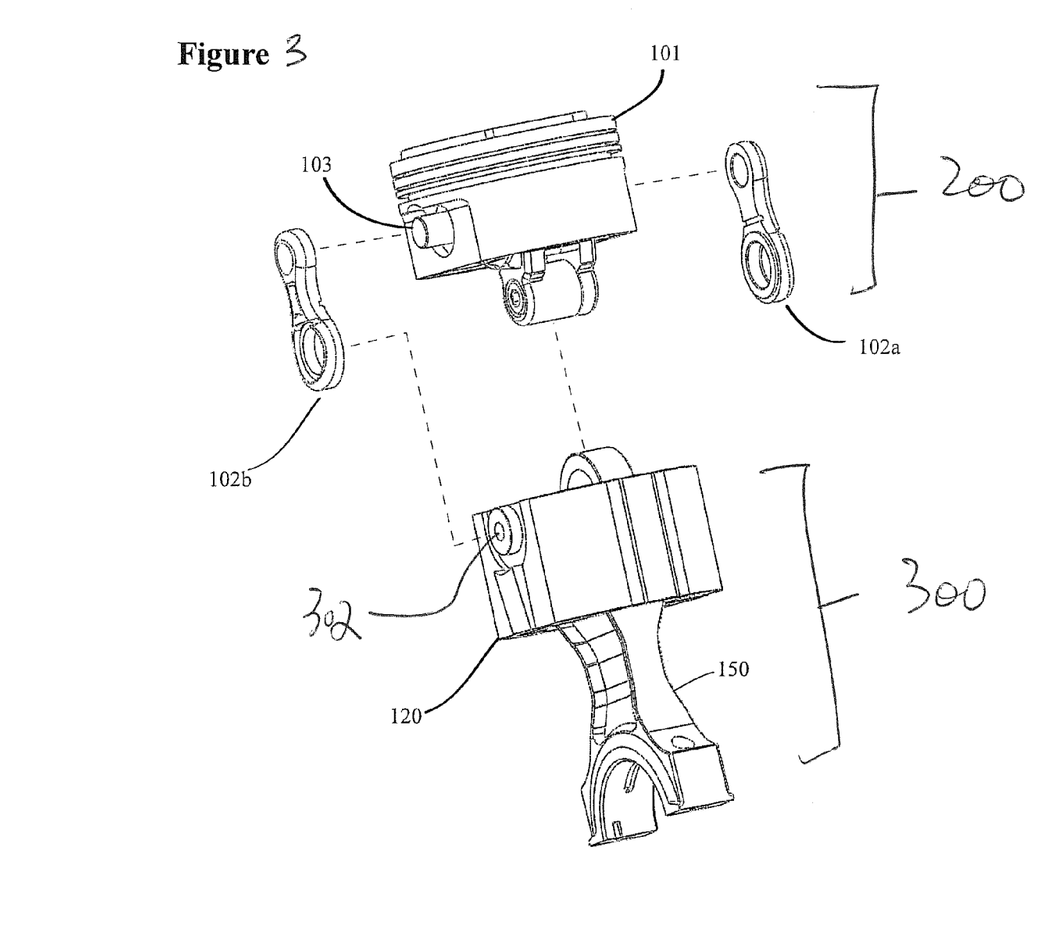
FIG. 3 is a representative isometric view showing how piston assembly 200 and connecting rod/follower assembly 300 are coupled together.

FIG. 3 is a representative isometric view showing how piston assembly 200 and connecting rod/follower assembly 300 couple together. It shows the two positioning links 102a and 102b attach to the piston at wrist pin 103 and to the follower 120 at boss 302, as represented by the dashed lines. Each positioning link 102a and 102b has a second end which fastens to either end of the wrist pin 103, and a first end which fastens to corresponding bosses 302 located on opposite faces of the follower 120. As a result, the follower 120 is fastened to the piston assembly 200 rigidly in the vertical direction, with a gap or space in between depending on the vertical length of the main link 110 and positioning links 102a and 102b. Follower 120 and piston assembly 200 move in unison, as a unit, up and down within the cylinder (not shown). Additionally, positioning link 102a and 102b and the gap or space allows follower 120 and piston assembly 200, while moving in unison up and down, sliding alternatively to and fro and horizontally against each other, as allowed by the slight clearance between follower 120 and piston assembly 200 combination and the cylinder. This is an improvement and main distinction over the embodiment described in U.S. Pat. No. 4,567,866 to Schubert in which the piston and the sliding guide, as it was therein termed, each moved up and down within the cylinder, independent of the other.

Referring to FIG. 1D, main link 110 has a second end portion having a hole of larger diameter 172 connected to a piston 101. In one embodiment, wrist pin 103 inserts through piston 101 and through the larger diameter hole 172 in main link 110 and is able to rotate around the axis defined by the large hole 172, but is adequately confined in translation due to geometry in the piston 101.

Rotation of the crankshaft (not shown) causes simultaneous pivotal movement of the connecting rod 150, which acts as a lever, and furthermore causes displacement of the main link 110 and piston 101. The results are described in the following paragraphs.

Figure 4A:
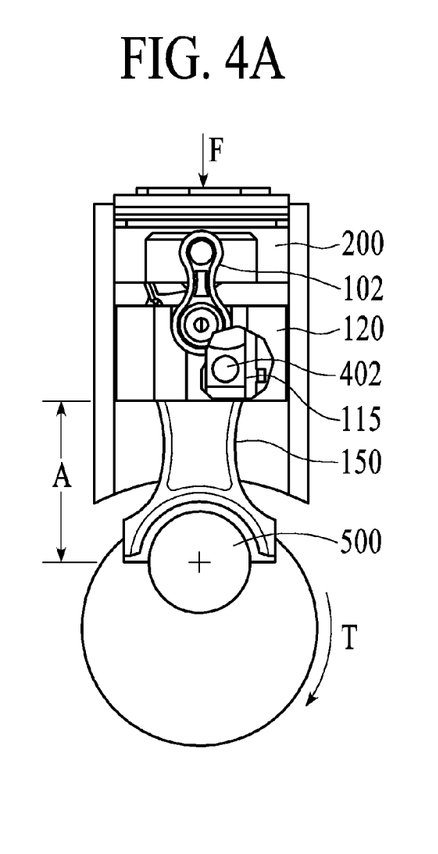
FIGS. 4A, 4B and 4C illustrates the operation of an embodiment of the present invention wherein the crankshaft rotationally moves from its TDC or 0 degrees (FIG. 4A) to 90 degrees (FIG. 4B) to BDC or 180 degrees (FIG. 4C).
Figure 4B:
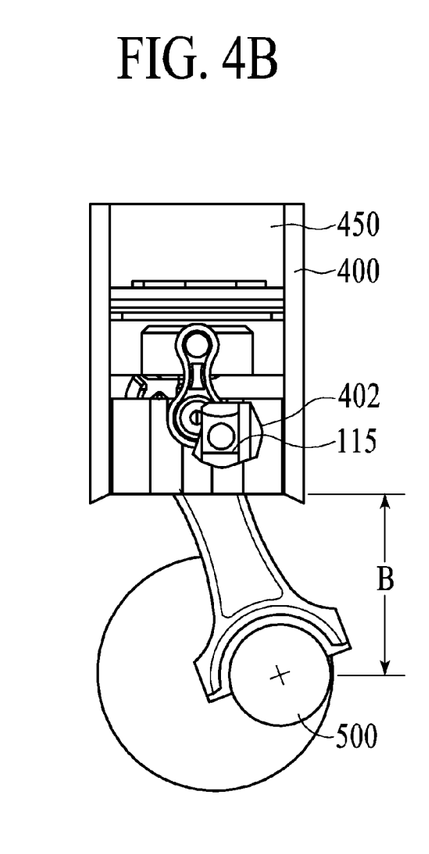
Figure 4C:
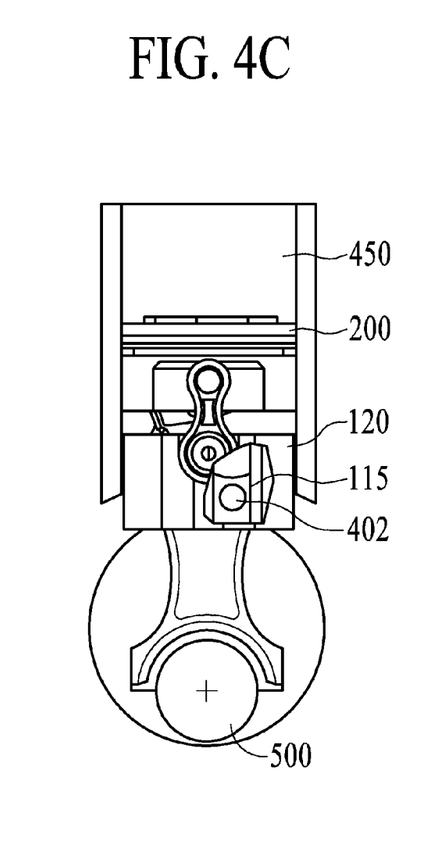

FIGS. 4A, 4B and 4C illustrate the operation of an embodiment of the present invention wherein the crankshaft rotationally moves from its TDC or 0 degrees (FIG. 4A) to 90 degrees (FIG. 4B) to BDC or 180 degrees (FIG. 4C).

In one embodiment, during the typical four stroke cycle, main link 110 at its first end portion 176, through the lever action to connecting rod 150 at its upper top opening 156, lifts piston assembly 200 and subsequently follower 120 which is fastened by two positioning links 102a and 102b. The lifting of the piston assembly 200 and follower 120 combination, subsequently causes slides 115 to slide vertically along the flat surfaces 162 of the four follower inserts 160 as allowed and within the follower 120. The lever action created by main link 110 on connecting rod 150 and the sliding of the created fulcrum 402 located where the lower top opening 154 meets connecting pin 151 and slides 115 places the fulcrum 402 at different relative positions to the follower 120 during the four stroke cycle.

As best shown in FIG. 4A, as piston 101 approaches its top dead center position TDC the fuel mixture is ignited. The working pressure of the burning fuel mixture imposes a force F on piston assembly 200 and piston assembly 200 is driven downward within cylinder 400. This is the beginning of the expansion or power stroke. While the descent is happening, slides 115 that are connected to connecting rod 150 at its lower top opening 154 (the fulcrum 402) begin to slide upwardly along the flat surfaces 162 of the four follower inserts 160 within the follower 120. The upward sliding of the fulcrum 402 offsets part of the descent distance of the piston assembly 200 (lifting of piston assembly 200). Since piston assembly 200 moves in unison with follower 120, distance A which measures the distance between the bottom of follower 120 to the center of crank pin 500 of FIG. 4A (TDC position) is shorter than distance B of FIG. 4B (90 degree position). As the power stroke continues and passes the 90 degree position, the fulcrum 402 slides downward within follower 120 until the end of the power stroke is reached, as shown in FIG. 4C. Consequently, the assembly allows for a slower piston speed, and a subsequent slowing of the piston speed throughout the duration of the power stroke. Henceforth, the volume of the combustion chamber 450 (partly shown) decreases slower during the power stroke, permitting higher pressure per unit of time. In one embodiment, the greatest compression position of the piston assembly 200 occurs when the crank pin 500 has reached between 14 degrees and 18 degrees from the TDC position during the power stroke. This higher pressure is also applied to the connecting rod 150 at a more favorable angle, wherein the crank pin 500 is at a position further along in the directional path of rotation, and therefore transmits more rotational force or torque T to the crankshaft and subsequently to the fly wheel (not shown). The crankshaft piston interface of the present invention 100 permits a shorter cylinder 400 and a more stabilized follower 120. Because the distance between the piston 101 and the follower 120 is fixed, it utilizes less space within a cylinder chamber 450. An overall smaller combustion chamber allows volume to drop at a slower rate during the power stroke while simultaneously maintaining a higher pressure.

Another aspect of crankshaft piston interface of the present invention 100 is that it provides an optimized system of transforming piston-produced pressure into rotational energy through the use of a shorter cylinder and a more stabilized follower 120. In the piston-follower assembly of the present invention 100, the distance between the piston 101 and follower 120 is fixed. In addition, the piston-follower assembly of the present invention 100 utilizes less space within a cylinder chamber 450. An overall smaller combustion chamber causes volume to drop at a slower rate during the power stroke while simultaneously maintaining a higher pressure. This results in a more fuel efficient engine.

Yet another feature of the present invention is a more balanced follower, wherein the fulcrum created by the point at which the connecting rod connects to the sliding mechanism of the follower is supported by slides and slide inserts as it glides in a vertical motion within the follower. This eliminates the wear on the follower caused by twisting within the cylinder, a problem described in the prior art.

Embodiments disclosed herein include improved crankshaft and piston that results in improved fuel efficiency, in some instances, by 30-40%. Embodiments disclosed further enable slowing the piston speed down at the top, thereby allowing higher pressure within the cylinder chamber for a longer duration of time, and throughout the duration of the power stroke. Preferred embodiments include an improved crankshaft-to-connecting rod angle wherein the crankshaft is pushed in the direction of rotation. Preferably, as the volume inside the cylinder gets smaller, expansion also slows down, thereby retaining pressure for a longer duration of time. The result is that energy converted into rotation is substantially increased and heat loss is considerably lowered.

Figure 5:
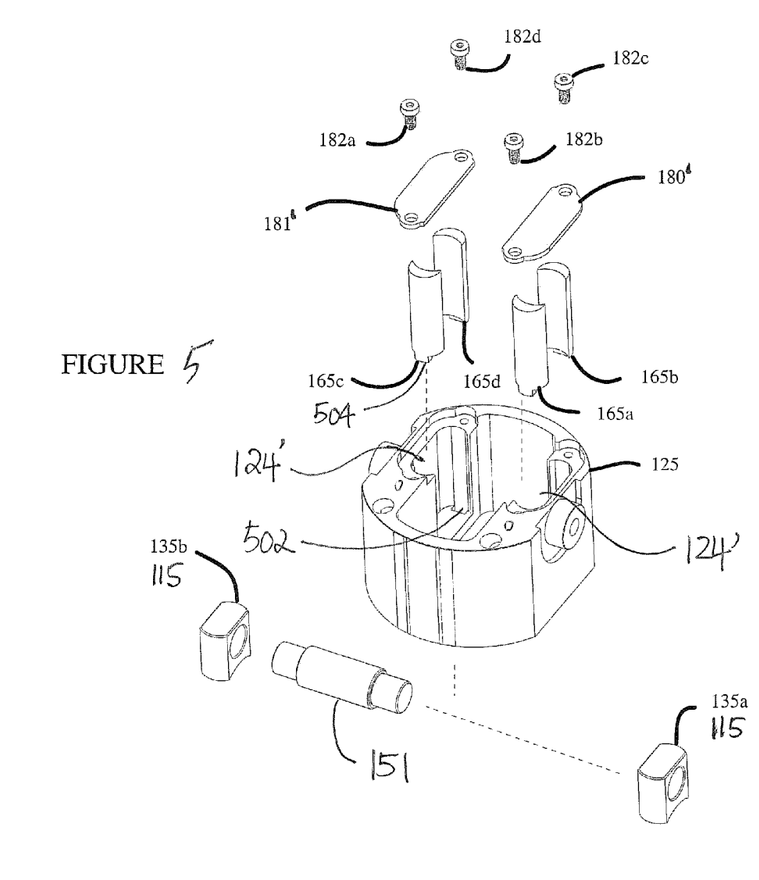
FIG. 5 is a representative exploded view that illustrates an alternative embodiment of the sliding assembly of crankshaft piston interface of the present invention 100.

FIG. 5 is a representative exploded view that illustrates an alternative embodiment of the sliding assembly which includes two slides 115, 4 identical alternative follower inserts 165a-d and follower 125. Instead of having their position secured by two follower retainers 180', as best shown in FIG. 1D, each follower insert 165 has a protrusion 504 at its bottom which is fittingly received by a corresponding notch 502 in the floor of grooves 124' of follower 125. The positions of the four follower inserts 165a-d are further secured by two cover plates 180' and 181' and four screws 182a-d.

Figure 6:
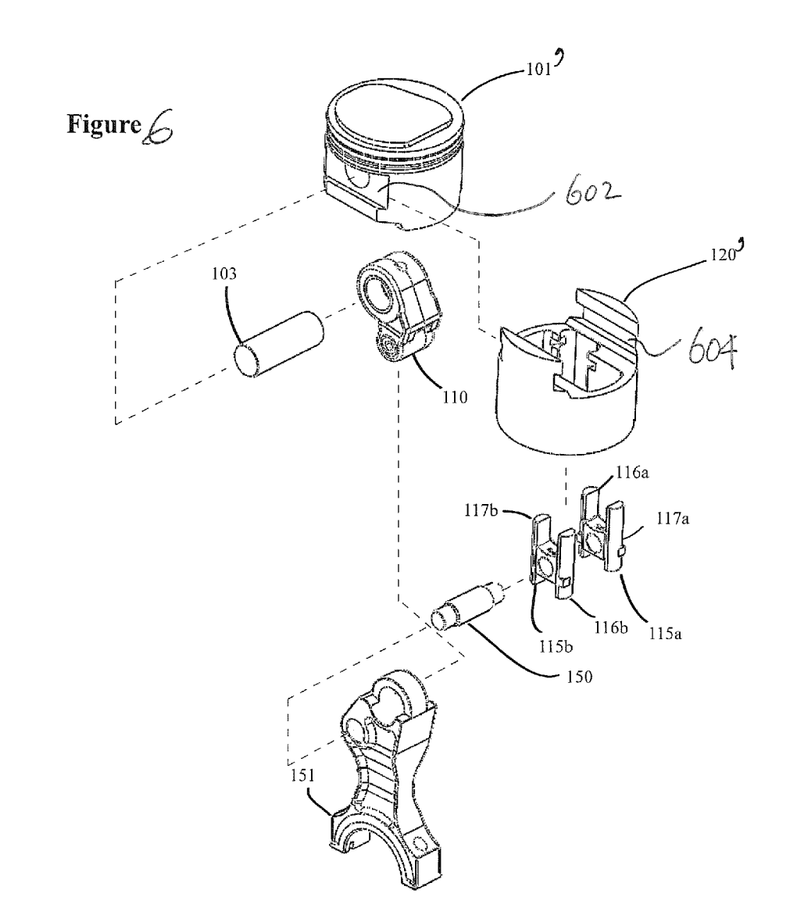
FIG. 6 is an exploded view of an alternative embodiment of the follower 120' showing fastening of the piston 101' to the follower 120'.

FIG. 6 is an exploded view of an alternative embodiment of follower 120' showing fastening of the piston 101' to the following 120'. As previously described and shown in FIG. 3, piston 101' and the follower 120' must be coupled together somewhat rigidly such that they move up and down in unison within the cylinder 400. In one alternative embodiment, instead of using position links 102a and 102b to fasten the two parts, piston 101' has straight, horizontal protrusions 602 on either outside faces, for which follower 120' has matching straight, horizontal grooves 604 to slidably and fittingly receive the protrusions 602, thereby fastening piston 101' to follower 120'. This alternative embodiment also allows follower 120' and piston 101', while moving in unison up and down, sliding alternatively to and fro and horizontally against each other, as allowed by the slight clearance between follower 120'/piston 101' combination and the cylinder (not shown).

It will be understood by those skilled in the art that due to the changed piston movement in the improved piston/engine rod interface of the present invention, the valve timing has to be modified to follow the piston.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. In an internal combustion engine having a crankshaft with a crank pin and performing a power stroke during an operational cycle, a piston crankshaft linkage, comprising in combination:

a connecting rod having two ends, the distal end rotatably linked with the crank pin, the proximal end further having a circular upper off-centered opening and a circular lower off-centered opening positioned beneath and in the opposite half of the connecting rod from the upper off-centered opening;

a slide connecting pin inserted through the lower off-centered opening of the connecting rod, the slide connecting pin rotatably fastened at both ends by two identical slide members, each slide member further having two side slide panels;

a hollow follower having two identical grooves, each groove further having two side walls, four identical elongated follower inserts disposed fittingly on each side wall of the grooves, each follower insert further having an exposed flat panel dimensioned matchingly to the slide panels of the slide members, the grooves further dimensioned to fittingly receive the connecting rod such that each of the two side slide panels of the two slide members coupled slidably with its corresponding exposed flat panel of the follower inserts, such that the connecting rod slides and swivels freely within the follower during the operation cycle;

a linking member having an upper and a lower extension, the lower extension connected pivotally to the upper off-centered opening of the connecting rod by mechanical means;

a piston having a first wrist pin for pivotally connecting the piston to the upper extension of the linking member, the wrist pin inserted through the piston and the upper extension and having two exposed ends; and two connecting members each having two extensions, the upper extensions connected rotatably to the exposed ends of the wrist pin, the lower extensions connected rotatably to two exterior sides of the follower, the connecting members fastened the piston and the follower rigidly such that the piston and the follower move vertically in unison during the operation cycle.

* * * * *